June 11, 1935.  H. A. THOMSON  2,004,450
MEANS FOR FACILITATING REFERENCE TO AND READING OF BOOKS AND THE LIKE
Filed Aug. 5, 1932   2 Sheets-Sheet 1
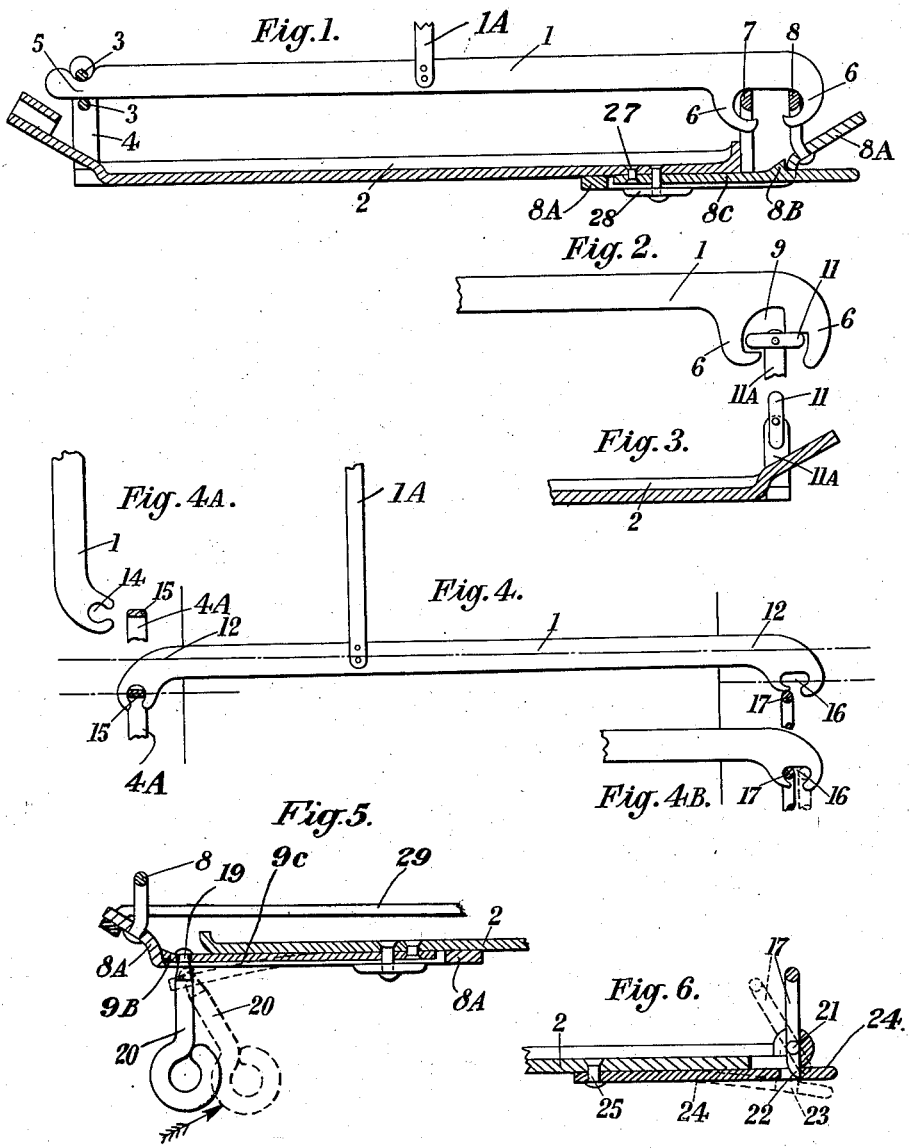

June 11, 1935. H. A. THOMSON 2,004,450
MEANS FOR FACILITATING REFERENCE TO AND READING OF BOOKS AND THE LIKE
Filed Aug. 5, 1932  2 Sheets-Sheet 2
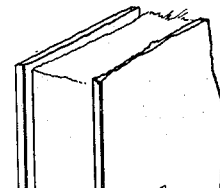
Fig. 7.
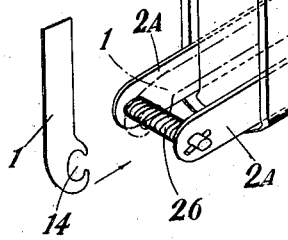
Fig. 8.
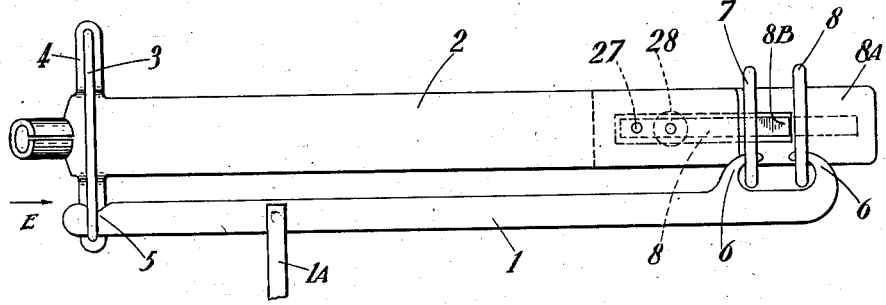
Fig. 9.
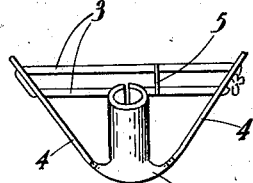
Fig. 10.
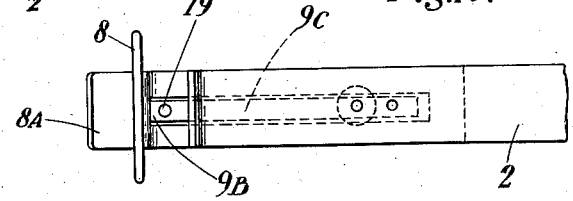
Fig. 11.
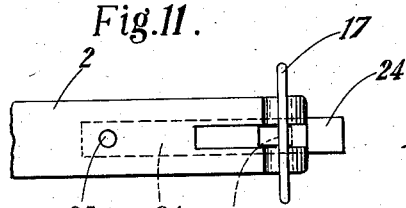
INVENTOR
H. A. Thomson.
By Lacey & Lacey,
Attys.

Patented June 11, 1935

2,004,450

UNITED STATES PATENT OFFICE 2,004,450

MEANS FOR FACILITATING REFERENCE TO AND READING OF BOOKS AND THE LIKE

Hugh Alexander Thomson, Kensington, London, England

Application August 5, 1932, Serial No. 627,627
In Great Britain August 6, 1931

6 Claims. (Cl. 116—119)

This invention relates to book markers and has particular reference to a marker adapted to be attached to and supported by a frame or holder as described in U. S. Patent No. 1,936,489, dated November 21, 1933.

An object of the present invention is to provide a marker adapted to be used with the above-mentioned device.

A further object is to provide a marker which may be positively held and which need not impede closing a book in which it is used.

A further object is to provide a book marker in which a plurality of interleaving members may be quickly and easily placed between desired leaves of a book and will yet leave the book free to be opened and closed, all these members being held and locked by common means. To facilitate this, the members are preferably strips of very thin spring or like steel giving rigidity in all material respects, with strength and compactness.

The invention is illustrated in several adaptations by the accompanying drawings in which:—

Figure 1 is a part sectional side elevation of one form of the invention;

Figures 2 and 3 show a broken view of a detail in two positions;

Figure 4 with Figures 4A and 4B show similarly an alternative form;

Figure 5 shows a detail applicable to various forms of the invention;

Figure 6 similarly shows a detail,

Figure 7 shows an alternatively proposed form of carrier for the book-marker.

Figure 8 is a plan view of the structure shown in Figure 1.

Figure 9 is an end elevation of the same as seen from the viewpoint indicated by the arrow E in Figure 8.

Figure 10 is a plan view of the arrangement shown in Figure 5.

Figure 11 is a plan view of the arrangement shown in Figure 6.

In the marker shown in Figure 1, the actual interleaving member 1 in the form of a strip, preferably of metal and forming an interleaving member carrying any desired indicating means 1a is secured to a frame part 2 (which may form part of the device described in my above identified patent). The means for interattachment between members 1 and 2 are varied slightly in various adaptations. At one end in Figure 1 the attachment comprises an India-rubber or other elastic band 3 stretched between upstanding arms 4 of frame 2 and embracing a neck 5 formed near the end of the member 1. This affords a suitably yielding and flexible connection. At the other end, connection and locking are effected by the provision on the member 1 of a claw formed by inturned arcuate prongs 6 which are engaged by two upstanding loops 7, 8, the loop 7 being fixed to the frame member 2 and the loop 8 being movable by virtue of being mounted on a slidable portion 8A. The element 8A is slotted to accommodate the stop 8B which is riveted at 27 to the member 2, said element 8A being retained in contact with the member 2 by a plate 28. When released from retention by the stop 8B carried by a resilient manipulatable member 8C, the element 8A may so move the loop 8 towards the loop 7 that loops 7 and 8 lie contiguously and may pass between the prongs 6 out of the claw. It should here be stated that when the loops 7, 8 are in position as illustrated and provided they form a suitable fit in the claw, they may suffice to hold the strip 1 in operative position, and to prevent angular movement thereof. A rubber band 29 may be provided to spring the part 8A into unlocked position.

Figures 2 and 3 show another form of the locking device in which the arms 6 form a recess 9 of special shape, adapted to be entered and engaged by a partially rotatable member 11 carried by an upward extension 11A of the member 2. When the member 11 is inserted within the recess 9 and turned to the position of Figure 2, it not only locks down that end of the strip 1, but also prevents endwise movement thereof as will be clear from the form of the recess and claws 6 shown in the drawings.

Figure 4 shows a modification in that the strip 1 is slightly cranked or bent as at 12 to render its positioning in a book more useful, and different holding means are provided though either of these is interchangeable with any means shown in other figures. Thus, the loops which engage the strip may be located near the axis about which the leaves move in opening and closing, that is, near the binding, and the strip 1 will nevertheless be free from possible jamming or crossing of the pages as it will move with the leaves between which it lies. This is an advantage where, as is intended, a number of strips 1 may be employed with one mutual holding and locking element.

At one end, the strip 1 is provided with a claw-like recess 14 (Figure 4A adapted to engage a part 15 of elongated section carried by the part 4A of the frame 2 and to lock thereon when in holding position as in Figure 4. The other end of strip 1 is held by a claw having a recess 16 adapted to be engaged by a loop 17 (akin to the loop 8 of Figure 1) which is resiliently mounted, for example, as shown in Figure 5 on a spring part 8A secured to the frame 2. The part 17 may thus be sprung into or out of engagement with the recess 16.

For library use or where it is desired to ensure against interference, the locking means of Figure 5 are preferred, wherein the part 9C has a hole 19 adapted to be engaged by a detachable key 20 or lever which is used to "spring" the part 9C into or out of engagement with the sliding part 8A, thus releasing the stop formed at 9B from the lower inner edge of the part 8A whereby loop 8 may be disengaged as in Figure 1.

Figure 6 shows an alternative locking means wherein a member or loop, such as 17, is carried pivotally at 21 by the member 2, and has a tail part 22 adapted to enter a recess 23 in a spring part 24 secured at 25 to the frame member 2. The dotted line shows the release position of the parts, from which it will be clear that the loop part 17 may be sprung into the locked position (in full line) when it is locked by virtue of the entry of tail 22 in recess 23, only to be released by depressing the spring part 24 as shown in dotted line.

Figure 7 shows a possible alternative to the frame 2 which is more particularly a form adapted to the book-holder shown in the prior patent above referred to. In Figure 7, the member 2 is replaced by members 2A, adapted to lie between the covers or binding of a book as shown, and held by resilient means 26 such as helically wound wire of oval or flattened cross section arranged to act in the manner of the part 15 in Figs. 4 and 4A for holding the corresponding end of the strip or strips 1. At the other end, resilient means similar to that shown at 26 is sprung into the recess 16 of the strip 1. Although not illustrated the parts 2A may then carry the strip-engaging or carrying parts such as 4, and the locking parts previously described.

I claim:—

1. A book marker comprising an interleaving member having its opposite ends bent laterally in the same direction, there being a recess in one of the bent ends of said member and forming a claw, a rigid frame member co-extensive with the interleaving member and spaced therefrom, means for interconnecting said members at one end thereof, and means for interconnecting and locking them at the other end comprising a longitudinally adjustable loop carried by the frame member and adapted to detachably engage said claw.

2. A book marker comprising an interleaving member, a rigid frame member co-extensive therewith and spaced therefrom, means for detachably connecting said members at one end thereof, and means for interconnecting and locking them at the other end comprising a pair of opposing claws on one member and a loop on the other member, a part of which loop is arranged to move longitudinally away from one end of the marker so as to become locked between the claws.

3. A book marker comprising an interleaving member, a rigid frame member co-extensive therewith and spaced therefrom, means for detachably connecting said members at one end thereof, and means for interconnecting and locking them at the other end comprising a claw on one member, a longitudinally adjustable loop in the other member adapted to detachably engage said claw, and means for locking the adjustable loop in engaging position, the last-mentioned means consisting of a resilient member extending longitudinally upon the frame member and arranged to spring outwardly for forming a removable abutment which bears against the loop and retains the latter normally in its outermost position.

4. A book marker comprising an interleaving member, a rigid frame member co-extensive therewith and spaced therefrom, means for detachably connecting said members at one end thereof, and means for interconnecting and locking them at the other end comprising a claw on one member, a longitudinally adjustable loop in the other member adapted to detachably engage said claw, and means for locking the adjustable loop in engaging position, the last-mentioned means consisting of a resilient member extending longitudinally upon the frame member and carrying a stop, said stop constituting an abutment normally retaining the loop in its outermost position, said resilient member being formed also adjacent its free end with an aperture for the insertion of a key whereby the stop may be moved out of engagement with the loop.

5. A book marker comprising an interleaving member, a rigid frame member co-extensive therewith and spaced therefrom, means detachably connecting said members at one end consisting of a recess formed in the interleaving member and a flattened laterally extending support carried by the frame member, and means for interconnecting and locking said members at the other end comprising a claw on one member and a longitudinally adjustable loop on the other member adapted to detachably engage said claw.

6. A book marker comprising an interleaving member, a rigid frame member co-extensive therewith and spaced therefrom, means for detachably connecting said members at one end thereof, and means for interconnecting them and locking them at the other end, said locking and interconnecting means comprising an aperture in the interleaving member at one side of the medial longitudinal line of said member, and an element carried by the frame member and movable thereon into or out of said aperture.

HUGH ALEXANDER THOMSON.